United States Patent [19]

Schipfer et al.

[11] Patent Number: 4,563,515
[45] Date of Patent: Jan. 7, 1986

[54] CATHODICALLY DEPOSITABLE PAINT BINDERS BASED ON THE REACTION PRODUCT OF EPOXY RESINS AND SECONDARY AMINES CARRYING CARBOXYLIC ACID AMIDE GROUPS

[75] Inventors: Rudolf Schipfer; Wolfgang Daimer; Gerhard Schmölzer, all of Graz, Austria

[73] Assignee: Vianova Kunstharz, A.G., Werndorf, Austria

[21] Appl. No.: 707,677

[22] Filed: Mar. 4, 1985

[30] Foreign Application Priority Data

Mar. 2, 1984 [AT] Austria .................................. 713/84

[51] Int. Cl.$^4$ ................................................ C08G 59/54
[52] U.S. Cl. .................................. 528/111; 204/181.7; 523/415; 523/416; 525/504
[58] Field of Search .................... 528/118, 104, 111; 523/415, 416; 525/504

[56] References Cited

U.S. PATENT DOCUMENTS

| 4,036,795 | 7/1977 | Tominaga ........................... 523/415 |
| 4,274,989 | 6/1981 | Tominaga et al. ................... 523/415 |
| 4,341,676 | 7/1982 | Patricca et al. ..................... 523/417 |
| 4,367,319 | 1/1983 | Pampouchidis et al. ........... 525/504 |
| 4,383,103 | 5/1983 | Kluger ................................ 528/111 |
| 4,477,642 | 10/1984 | Geist et al. ......................... 528/61 |

Primary Examiner—Earl Nielsen
Attorney, Agent, or Firm—A. W. Breiner

[57] ABSTRACT

Cationic synthetic resin binders free of epoxy groups for the formulation of electrodeposition paints are described. The binders are the reaction product of an epoxy resin carrying at least two epoxy groups and having an epoxy equivalent of 190 to 1000, with from 0.1 to 1.0 amino groups per available epoxy group of a secondary amine carrying carboxylic acid amide groups. Upon being crosslinked on stoving with a suitable hardening component, the binders have improved water dilutability, permitting a reduction of the degree of neutralization necessary for electrodeposition application and improved intercoat adhesion to addition coats. These improved characteristics are significant with respect to an increase of current yield and in adhering additional coatings of a paint system.

23 Claims, No Drawings

CATHODICALLY DEPOSITABLE PAINT BINDERS BASED ON THE REACTION PRODUCT OF EPOXY RESINS AND SECONDARY AMINES CARRYING CARBOXYLIC ACID AMIDE GROUPS

This invention is directed to a process for producing cathodically depositable paint binders for cathodic electrodeposition (CED) based on epoxy resins which are modified with secondary amines carrying carboxylic acid amide groups, and to the binders produced utilizing the process. The binders produced according to the invention permit the formulation of CED-paints which crosslink on stoving, preferably through reesterification, with the use of suitable hardening components.

It is an object of the present invention to prepare heat-hardenable, preferably through reesterification, cathodically depositable binders carrying short-chain carboxylic acid amide structures in the molecule. These structures improve the properties of CED-binders in general, particularly with regard to water dilutability and the effect of mediating adhesion of a subsequent coating. The improved water dilutability permits a reduction in the degree of neutralization necessary for application, permitting an increase of current yield. The improved intercoat adhesion to subsequent coats of paint eliminates difficulties encountered in the coating of electrodeposition (ED) primers with fillers, particularly with sealants, putties, or PVC-plastisols as are used for underbody protection of car bodies.

U.S. Pat. No. 4,274,989 discloses cathodically depositable CED-binders which are reaction products of epoxy resins or epoxy resin-amine adducts with aminoamide compounds of maleinized long-chain fatty acids and polyamines and also partially blocked polyisocyanates. In addition to the necessity of using isocyanates, and thus of applying high-curing temperatures of at least 175° C., this type of resin composition does not provide any substantial improvement in intercoat adhesion and leads to a reduction in corrosion protection. The same applies to U.S. Pat. No. 4,036,795 disclosing similar products.

DE-OS 32 24 864 discloses beta-amido-substituted polyesters as hardening components for hydroxy group containing polymers. As long as the products carry cationic groups, they can function as binders for ED-paints. The beta-amido-substituted side chain is split off during cure and evaporates from the coating, and thus cannot contribute to the adhesion of a subsequent coating.

Self-crosslinking resins are obtained according to U.S. Pat. No. 4,341,676, if polymers carrying primary or secondary amino groups are reacted with N-methylol (meth)acrylamide in a MICHAEL-reaction. Because of the crosslinking reaction, the crosslinking density is restricted to the number of amino groups capable of addition. However, as is known to one skilled in the art, the number of such groups should be kept as low as possible in order that other properties such as the electric deposition parameters are not adversely influenced.

It has now been found, according to this invention, that cationic binders for the formulation of cathodically electrodepositable paints based on epoxy resin-amine adducts carrying carboxylic acid amide groups can be obtained in a simple way through the use of specific secondary amines. Thus, the present invention is directed to the production of cationic synthetic resin binders free of epoxy groups which are particularly suited for the formulation of ED-paints through reaction of epoxy resins with secondary amines and optionally other hydrogen-active compounds, characterized in that an epoxy resin carrying at least two epoxy groups and having an epoxy equivalent of from about 190 to 1000, or mixtures of such epoxy resins, are reacted at 20° to 150° C., optionally in the presence of inert solvents, with 0.1 to 1.0 amino groups per available epoxy group of a secondary amine of the general formula

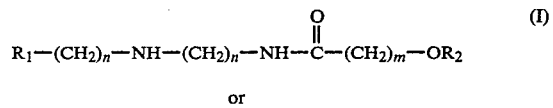

or

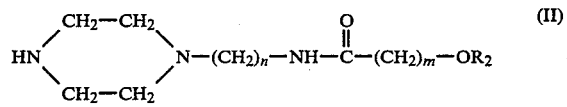

wherein
n is 2 through 4; m is 1 through 5, and
$R_1$ is —OH or

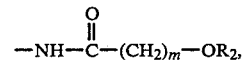

$R_2$ is —H or

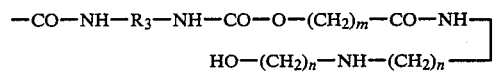

and
$R_3$ is an aromatic, cycloaliphatic or aliphatic hydrocarbon radical.

Optionally, a part of the available epoxy groups can be reacted before, simultaneously, or afterwards with some other hydrogen-active compound, provided that from 0.1 to 1.0 amino groups of the secondary amines of formulas I and II are reacted with the epoxy resin per available epoxy group.

The products produced according to the present invention have excellent dilutability with water even with a low degree of neutralization, whereby the current yield, i.e., the weight of film deposited through a defined quantity of current, is favorably influenced. A special advantage is the substantially improved intercoat adhesion of the ED-paints, particularly to coats of plastisols as are used for underbody protection in the automobile industry, antinoise compounds, etc. In addition to such specific improvements, the total performance of the obtained products is improved over known products.

The epoxy resins preferably used in the binders of the present invention are those based on bisphenol A, i.e., 4,4-bis(hydroxyphenyl)-propane, or phenol novolaks. Other epoxy resins such as those based on aliphatic di- or polyols including polyglycols, or epoxidized butadiene polymers are used to advantage in combination with the aforementioned preferred resins. The epoxy resins suitable for the purpose proposed are known to one skilled in the art from a large source of available references.

The secondary amines having the general formula above set forth which are useful herein in the simplest case are obtained through reaction of the primary amino groups of a dialkylene triamine or an alkylaminoalkanol amine, or a corresponding aminoalkylpiperazine amine with a hydroxy monocarboxylic acid ester or an inner ester (lactone) of such an acid. The polyamine used, in addition to a secondary amino group, must carry at least one primary amino group. Polyamines illustrative of this group of compounds are diethylene triamine, dipropylene triamine, aminoethyl ethanol amine, aminopropyl ethanol amine, and aminoethyl propanol amine. Suitable illustrative piperazine derivatives for use herein are aminoethylpiperazine, aminopropylpiperazine, and aminobutylpiperazine. The preferred hydroxy monocarboxylic acid esters are monoalkanol esters of glycolic acid (hydroxy acetic acid) or of hydroxy propionic acid, the lactones gamma-butyrolactone or epsilon-caprolactone. The preferred esters of hydroxycarboxylic acids are those with alkanols having from 1 to 8 C-atoms. These alkanols which split off during reaction will function as solvents for the reaction product. The reaction of these components is carried out at 25° to 100° C., an aminolysis of the ester linkage or the lactone group occurring. The reaction products are obtained either as solutions in the alcohol formed during reaction or in a solvent used for the reaction, such as a glycol ether.

The preferred components are the reaction products of one mole of diethylene triamine with two moles of glycolic acid butyl ester, or of one mole of aminoethylethanol amino with one mole of glycolic acid butyl ester. In place of the glycolic acid ester, epsilon-caprolactone can be used which is employed to advantage in a molar excess of 5 to 10%. A particularly favorable component is the reaction product of one mole of a diisocyanate with two moles of a glycolic acid ester, and the subsequent transamidation with two moles of amino-ethylethanol amine. Suitable diisocyanates are aromatic, cycloaliphatic, or aliphatic diisocyanates. The recorded amine values and the absorption spectra of the compounds are in accordance with the theoretically expected structure.

The reaction of the secondary amines carrying carboxylic acid amide groups with the epoxy resin is preferably carried out in an inert solvent, such as in a glycol ether, preferably monoethyleneglycol monoethylether or monopropyleneglycolmonomethylether, at a temperature of from 20°–150° C. The epoxy groups of the epoxy resin are reacted with the secondary amine in a ratio of 0.1 to 1.0 NH-group for each available epoxy group. The epoxy groups which are not reacting with the secondary amines are reacted with other compounds carrying reactive hydrogen groups, thereby enabling a variety of modifications of the final product. Thus, flexibilizing segments and/or segments which reduce the glass transition temperature can be introduced into the resins. Suitable active hydrogen compounds, as is known, are monomeric or oligomeric or polymeric compounds such as the polyglycols, polyetherpolyols, polyesterpolyols, polycaprolactonepolyols, mono- or dicarboxylic acids, polyesters with chain end carboxy groups or polybutadienehomo- or copolymers with chain end carboxy groups. Modification with the active hydrogen compound is preferably carried out prior to the reaction with the secondary amine.

A further modification of the binders of this invention is through the coemployment of other primary or secondary monoamines, or preferably of primary/tertiary diamines. Such modification results in an increase in the basicity of the materials, which means a further improvement of water dilutability and the pH-range at application. In addition to alkylamines, such as butyl amine or 2-ethylhexylamine, diethylamine, diethanolamine and the like, diamines exemplified by N,N-diethylpropanediamine-1,3 or N,N-dimethylpropanediamine-1,3 can be used. The reaction with the additional amines may be carried out simultaneously with or, preferably, after the reaction with the carboxylic acid amine group containing secondary amines. The reaction of the epoxy resin with the various modifiers is carried out at a temperature of from 20° to 150° C., until the desired epoxy value is attained. The epoxy value for the final product is zero or substantially zero.

In formulating the paints, the products are combined with hardening components such as amino resins, blocked isocyanates or, preferably, polyfunctional activated esters. The latter crosslink with the resins produced according to the present invention with the catalytic effect of the tertiary amino groups or optionally added heavy metal catalysts. Examples of such crosslinking agents are described in EP-A1-00 12 463, DE-OS 32 24 864, or AT-PS 372 099 corresponding to U.S. Pat. No. 4,458,054. The combinations of the binders produced according to the invention with the crosslinking agents are—prior to or after the partial neutralization with acids—optionally processed in known manner with pigments, extenders and catalysts, and diluted with water to the desired solids content. The paints can be applied by the ED-process or by dipping, spraying, roller coating, etc. The applied films are stoved for ten to thirty minutes at 160° to 180° C. The preparation and application of water-dilutable paints according to such methods are known to one skilled in the art.

The following examples illustrate the invention without limiting its scope. Parts and percentages refer to weight, unless otherwise stated.

The following methods of determination are used in the examples:

| | |
|---|---|
| Amine value | DIN 53 176 |
| Hydroxyl value | DIN 53 240 |
| Acid value | DIN 53 402 |
| Solids content | oven, 30 minutes at 120° C. |
| Melting point | Dr. Tottoli apparatus |
| Refractive index nD/20 | DIN 53 169 |
| Free amine | gaschromatograph |

The following abbreviations are used in the examples:

| | |
|---|---|
| GB-ester | glycolic butyl ester |
| DETA | diethylene triamine |
| AEEA | aminoethylethanolamine |
| AEP | aminoethylpiperazine |
| CPL | epsilon-caprolactone |
| PGME | propylene glycol monomethylether |
| EGL | ethyleneglycolmonoethylether |
| TDI | toluylene diisocyanate (available monomer blend) |
| HMDI | hexamethylene diisocyanate |
| BUGL | ethylene glycol monobutylether |
| EHA | ethylhexylamine |
| DEPDA | N,N—diethylpropanediamine-1,3 |
| DOLA | diethanolamine |
| EPH | epoxy resin |

(A) Preparation of Secondary Amines Carrying a Carboxylic Acid Amide Group for Use According to the Present Invention Amine A 1: This amine has the general formula (I) wherein n is 2; m is 1; $R_1$ is $-NH-C(O)-(CH_2)_m-OR_2$, and $R_2$ is H.

264 g (2 moles) of GB-ester are heated to 80° C. in a reaction vessel equipped with thermometer, stirrer, charging funnel, and reflux condenser. At this temperature, 103 g (1 mole) of DETA are added within a period of 60 minutes. After the addition is finished, the temperature is raised to 100° C., and the reaction is carried to an amine value of 153 mg KOH/g (reaction time about two hours).

The product has a solids content of 60% and crystallizes on cooling. After recrystallization from ethanol, the product has a melting point of 114±2° C. The content of free amine (gaschromatograph) is below 0.02%. IR—and $^1H$—NMR spectrum confirm the theoretically expected structure of the compound.

Amine A 2: This amine has the general formula (I) wherein n is 2; m is 1; $R_1$ is OH, and $R_2$ is H.

132 g (1 mole) of GB-ester are heated to 30° C. in a reaction vessel as described above. Within one hour 104 g (1 mole) of AEEA are added, the temperature rising to 60° C. with the exothermic reaction. The reaction is terminated when a sample has an amine value of 237 mg KOH/g, a refractive index nD/20 of 1.4705–1.4720, and a viscosity of 80 to 100 seconds (DIN 53 211/20° C.). The solids content of the amine is 60%, and the free amine value is less than 0.06%.

Amine A 3: This amine has the general formula (I) wherein n is 2; m is 5; $R_1$ is $-NH-CO-(CH_2)_m-OR$, and $R_2$ is H.

103 g (1 mole) DETA are heated to 40° C. and within 90 minutes 239 g (2.1 moles) of CPL are added. The temperature is held at 40° C. for two hours. The temperature is raised to 60° C., and the reaction is carried out at 60° C. to an amine value of 156 mg KOH/g. The reaction product is diluted with PGME to a solids content of 50%. The product crystallizes when cold. The free amine value is below 0.02%; the melting point (after recrystallization in EGL) is 84°–87° C.

Amine A 4: This amine has the general formula (I) wherein n is 2; m is 5; $R_1$ is $-OH$, and $R_2$ is H.

To 104 g (1 mole) of AEEA, 125 g (1.1 moles) of CPL are added at room temperature within one hour. The temperature is held at 30° C. by cooling the reaction vessel. The reaction is terminated after approximately three to six hours when a sample has an amine value of 254 mg KOH/g, a refractive index of 1.502–1.510, and a viscosity (10 g of sample+3 g of EGL) of O-Q (Gardner-Holdt). After a few days the product solidifies to a waxlike mass. The product has characteristics as follows: solids content of 97%; hydroxyl value of 720 mg KOH/g, and free amine value of below 0.02%.

Amine A 5: This amine has the general formula (I) wherein n is 2; m is 1; $R_1$ is OH; $R_2$ is

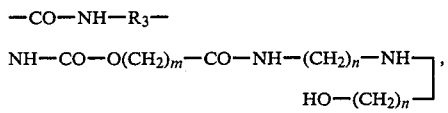

and $R_3$ is a toluylene radical.

264 g (2 moles) of GB-ester are heated to 60° C. and then 174 g (1 mole) of TDI are added within one hour. The temperature is thereafter raised to 100° C. and held for two hours. The temperature is raised to 120° C. within an addition period of 30 minutes, and the reaction is carried out to an NCO-value of below 0.5%. The batch is diluted with 599 g PGME and cooled to 80° C. Within one hour, 208 g (2 moles) of AEEA are added to the batch, the reaction temperature being held at 80° C. by cooling of the reaction vessel. This temperature is held until an amine value of 90 mg KOH/g and a refractive index of between 1.4610 and 1.4630 is attained. The product has characteristics as follows: solids content of 40%; free amine value of below 0.8%, and viscosity (DIN 53 211/20° C.) of 25 seconds.

Amine A 6: This amine has the general formula (I) wherein n is 2; m is 1; $R_1$ is OH; $R_2$ is $-CO-NH-R_3-NH-CO-O-(CH_2)_m-CO-NH-(CH_2)_n-NH-(CH_2)_n-OH$, and $R_3$ is a hexamethylene radical.

264 g (2 moles) of GB-ester are heated to 60° C. and 168 g (1 mole) of HMDI are added within one hour. The batch is heated to 100° C., and the reaction is carried to an NCO-value of below 0.5%. After dilution with 590 g of PGME, the batch is cooled to 80° C. 208 g (2 moles) of AEEA are then added at 80° C. within one hour. The temperature is held until the amine value of a sample has attained 91 mg KOH/g. The product is a waxlike, partly crystalline substance having characteristics as follows: solids content of 40%, free amine value of below 0.5%, and melting range of 132°–136° C.

Amine A 7: This amine has the general formula (II) wherein n is 2; m is 1, and $R_2$ is H.

185 g (1.4 moles) of GB-ester are added at room temperature within one hour to 129 g (1 mole) of aminoethylpiperazine, the reaction temperature not being allowed to surpass 40° C. The temperature is held for another four to six hours until a refractive index (20° C.) of 1.485–1.489 and an amine value of 210 mg KOH/g of a sample is attained. The product has characteristics as follows: solids content of approximately 60%, and Free amine value of below 0.6%.

Amine A 8: This amine has the general formula (II) wherein n is 2; m is 5, and $R_2$ is H.

148 g (1.3 moles) of CPL are added at room temperature to 129 g (1 mole) of aminoethylpiperazine. The temperature is raised to 40° C. and held for six to eight hours. The reaction is terminated when a refractive index (20° C.) of 1.510–1.519 and an amine value of 240 mg KOH/g of a sample is attained. The amine has a free amine value of below 0.8%.

(B) Preparation of the Modifiers For Use in the Present Invention

MOD 1: A carboxy group containing polyester is prepared as follows:

210 g (0.705 moles) of castor oil, 90 g (0.608 moles) of phthalic acid anhydride, 20 g of toluol, and 1 g of triethylamine are heated to 180° C. under the protection of inert gas and reacted until an acid value of 105 to 120 mg KOH/g of a sample is attained. At 165° C., 90 g (0.672 moles) of trimethylolpropane, 100 g (0.82 moles) of benzoic acid, 80 g (0.588 moles) of pentaerythritol, and 100 g (0.602 moles) of isophthalic acid are added. With azeotropic distillation with toluol, the temperature is raised to 225° C. at a rate of 20° C. per hour. After reaching 200° C., the acid value is determined at intervals of one hour, until the acid value of a sample has fallen below 4 mg KOH/g. The solvent is vacuum-stripped and the batch is cooled to 125° C. The viscosity of a 50% solution is 60–80 seconds (DIN 53 211/20° C.).

At 125° C., 100 g (0.658 moles) of tetrahydrophthalic acid anhydride are added, with the temperature being lowered to 110° C. The reaction is continued at 110° C. until an acid value of 50 to 60 mg KOH/g of a sample and a viscosity (DIN 53 211/20° C.) of between 80 and 100 seconds of a 50% solution in BUGL is attained. The resin is diluted with PGME to a solids content of 85%.

MOD 2: A carboxy group containing polyester is prepared as follows:

408 g (3 moles) of trimethylolpropane, 292 g (2 moles) of adipic acid, and 158 g (1 mole) of isononanoic acid are heated to 130° C. under the protection of inert gas. At a rate of 10° C. per hour the temperature is raised to 230° C., the reaction water which is formed being distilled off through azeotropic distillation with toluol. As soon as an acid value of about 4 mg KOH/g of a sample is reached, the entraining agent is vacuum-stripped and the batch is cooled to 125° C. The viscosity of a solution of 91 g of resin and 49 g of PGME corresponds to an efflux time, DIN 53 211/20° C., of 90 to 110 seconds.

At 125° C., 152 g (1 mole) of tetrahydrophthalic acid anhydride are added, with the temperature being lowered to 110° C. The reaction is continued at 110° C. until an acid value of 72–77 mg KOH/g of a sample and an efflux time (DIN 53 211/20° C.; 84 g of resin + 56 g of PGME) of 85–100 seconds is attained. The resin is diluted with PGME to a solids content of 80%.

EXAMPLE 1

1520 g (3.2 epoxy-Val) of EPH I (bisphenol A-diglycidylether: epoxy equivalent 475) are dissolved at 100° C. in 275 g of EGL and reacted with 470 g (0.4 COOH-Val) of MOD 1 at 110° C., until the acid value of a sample has fallen below 0.2 mg KOH/g. Thereafter, an additional 135 g of EGL and 760 g (4 epoxy-Val) of EPH II (bisphenol A-diglycidylether: epoxy equivalent 190) are added and, at 65° C., 734 g (2.0 NH-Val) of Amine A 1 is added. The temperature is slowly raised to 80° C. After one hour the viscosity (Gardner-Holdt) of a sample of 65 g, diluted with 35 g EGL is J–K. After cooling to 70° C., 219.3 g (1.7 moles) of EHA and 78 g (0.6 moles) of DEPDA are added, and the temperature is raised to 120° C. within two hours. After a reaction time of four hours at this temperature, the batch is diluted with EGL to a solids content of 65%. The product has the following characteristics: amine value of 82 mg KOH/g, and a viscosity (Gardner-Holdt, 64 g of sample + 35 g of EGL) of L–M.

In the above example and in the following examples, the term "Val" is used to express the equivalent weight in grams for the designated functional group and, accordingly, is equivalent to groups. Thus, 3.2 epoxy-Val means that there are 3.2 epoxy groups available; 2.0 NH-Val means that there are 2 NH groups available, and 0.4 COOH-Val means that there are 0.4 COOH groups available. The term "Val" is used for convenience.

EXAMPLE 2

1520 g (3.2 epoxy-Val) of EPH I are dissolved at 100° C. in 274 g of EGL and reacted at 110° C. with 353 g (0.3 COOH-Val) of MOD 1, until an acid value of a sample has fallen below 0.2 mg KOH/g. After addition of 134 g of EGL and 760 g (4 epoxy-Val) of EPH II at 60° C., 472 g (2.0 NH-Val) of Amine A 2 are added. The batch after about two hours is diluted with 111 g of EGL and 219.3 g (1.7 moles) of EHA. 78 g (0.6 moles) of DEPDA are then added. Within two and one-half hours the temperature is raised to 120° C. and held for another four hours. The resin is diluted with EGL to a solids content of 65%. The resin has an amine value of 82 mg KOH/g, and a viscosity (Gardner-Holdt, 64 g sample + 36 g EGL) of M–N.

EXAMPLE 3

1283 g (2.7 epoxy-Val) of EPH I are dissolved at 100° C. in 226 g of EGL and reacted with 597 g (0.5 COOH-Val) of MOD 1, until an acid value of a sample is below 0.4 mg KOH/g. After dilution with 229 g of EGL, 380 g (2 epoxy-Val) of EPH II are added, and, at 60° C., 584 g (0.8 NH-Val) of Amine A 3 is added. Within one hour the temperature is raised to 80° C. and held for another two hours. The viscosity (Gardner-Holdt, 70 g of sample + 30 g of EGL) is G–H. After addition of 195 g (1.5 moles) of DEPDA, the temperature rises to 90° C. through the exothermic reaction. The temperature is further raised to 120° C. within two hours and held for another four hours. The batch is diluted with EGL to a solids content of 57%. The product has an amine value of 76 mg KOH/g, and a viscosity (Gardner-Holdt, 74 g of sample + 26 g of EGL) of I–J.

EXAMPLE 4

190 g (1 epoxy-Val) of EPH II and 1425 g (3 epoxy-Val) of EPH I are dissolved at 100° C. in 652 g of EGL. After cooling to 60° C., 278 g (1.2 NH-Val) of Amine A 4 are added and the batch is reacted at 70° C. for one hour. The viscosity (Gardner-Holdt, 70 g of sample + 30 g of EGL) is I–J. After addition of 169 g (1.3 moles) of DEPDA, the temperature is raised to 120° C.; and, after four hours, the batch is diluted with EGL to a solids content of 65%. The product has an amine value of 98 mg KOH/g, and a viscosity (Gardner-Holdt, 64 g of sample + 36 g of EGL) of S–T.

EXAMPLE 5

1805 g (3.8 epoxy-Val) of EPH I and 342 g (1.8 epoxy-Val) of EPH II are dissolved at 100° C. in 417 g of EGL. At 60° C., 872 g (1.4 NH-Val) of Amine A 5 are added. The temperature is raised to 80° C. and held until the viscosity (Gardner-Holdt, 72 g of sample + 28 g of EGL) has reached H–I. After cooling to 60° C., 168 g (1.6 moles) of DOLA are added and, after a reaction time of one hour, 143 g (1.1 moles) of DEPDA are also added. Through the exothermic reaction the temperature rises to 120° C. within two and one-half hours. After another four hours, the batch is diluted with EGL to a solids content of 65%. The product has an amine value of 98 mg KOH/g, and a viscosity (Gardner-Holdt, 64 g of sample + 36 g of EG) of O–P.

EXAMPLE 6

1805 g (3.8 epoxy-Val) of EPH I are dissolved at 100° C. in 433 g of EGL. After cooling to 60° C., 861 g (1.4 NH-Val) of Amine A 6 are added, and the batch is reacted at 70° C. for two hours. Then, 82 g of EGL and 342 g (1.8 epoxy-Val) of EPH II are added. At 60° C., 126 g (1.2 moles) of DOLA are added. After a reaction time of two hours, the temperature is again raised to 70° C., and 169 g (1.3 moles) of DEPDA are added. The temperature of the batch is raised to 90° C. and reacted at 90° C. for another hour. The reaction is completed during four hours at 120° C. The batch is diluted to a solids content of 65% with EGL. The product has an amine value of 98 mg KOH/g, and a viscosity (Gardner-Holdt, 56 g of sample+44 g of EGL) of S–T.

EXAMPLE 7

1629 g (3.43 epoxy-Val) of EPH I are dissolved in 265 g of PGME and reacted at 110° C. with 353 g (0.3 COOH-Val) of MOD 1 to an acid value of below 0.2 mg KOH/g of a sample. After addition of 251 g of PGME, the batch is cooled to 60° C. and a blend of 187 g of PGME, 565 g (1.8 NH-Val) of Amine A 7, and 78 g (0.6 moles) of DEPDA is added within two hours. The batch is held at 60° C. for another two hours, and at 90° C. for two additional hours. The product has an amine value of 114 mg KOH/g, and a viscosity (Gardner-Holdt, 60 g of sample+40 g of PGME) of U.

EXAMPLE 8

1520 g (3.2 epoxy-Val) of EPH I are dissolved in 240 g of EGL and, at 110° C., are reacted with 473 g (0.3 COOH-Val) of MOD 2 to an acid value of below 0.2 mg KOH/g of a sample. After addition of 142 g of EGL, at 80° C., 760 g (4.0 epoxy-Val) of EPH II and, at 60° C., a blend of 116 g of EGL, 219.3 g (1.7 moles) of EHA, 522 g (2.0 NH-Val) of Amine A 7, and 78 g (0.6 moles) of DEPDA is added within two hours. The reaction is finished by holding at 60° C. for two hours, and at 90° C. for another four hours. The product has an amine value of 116 mg KOH/g, and a viscosity (Gardner-Holdt, 50 g of sample+50 g of EGL) of M–N.

EXAMPLE 9

1520 g (3.2 epoxy-Val) of EPH I are dissolved in 240 g of EGL and, at 110° C., are reacted with 473 g (0.3 COOH-Val) of MOD 2 to an acid value of below 0.2 mg KOH/g of sample. After addition of 1032 g of EGL, 760 g (4.0 epoxy-Val) of EPH II at 80° C., and at 60° C. a blend of 117 g of EGL, 219.3 g (1.7 moles) of EHA, 508 g (2.0 NH-Val) of Amine A 8, and 78 g (0.6 moles) of DEPDA is added within two hours. The batch is held at 60° C. for another two hours, and at 90° C. for six additional hours. The product has an amine value of 112 mg KOH/g, and a viscosity (Gardner-Holdt, 60 g of sample+40 g of EGL) of K–L.

Evaluation of the Binders Prepared According to the Invention

The products prepared according to Examples 1 to 9 are mixed, in a ratio of 80:20 (calculated on solids content), with a crosslinking component (see below) and, after addition of the quantities of formic acid listed in Table 1, are ground with pigments and fillers as given below in the formulation. After addition of the catalyst, the batch is diluted with deionized water to a solids content of 16% and homogenized through stirring for 24 hours. Degreased cold-rolled steel panels are coated electrophoretically in known manner, the panels being wired as the cathode. The dry film thickness, in all cases, is between 18 and 22 μm. The results are listed in Table 1.

Paint Formula:
80 parts resin solids (according to example number)
20 parts crosslinking component (resin solids)
36.5 parts titanium dioxide
20 parts aluminum silicate pigment
3 parts lead silicate pigment
0.5 parts carbon black
0.5 parts lead octoate The crosslinking component used is the reesterification product of 396 parts of malonic acid dimethyl ester and 134 g of trimethylolpropane to provide a polyfunctional malonic acid ester. This ester corresponds to Component B 2 of U.S. Pat. No. 4,458,054.

Methods of Testing:
(1) Salt Spray Test ASTM-B 117-64
   Stoving conditions:
      (A) 30 min/160° C.
      (B) 20 min/180° C.
(2) Acetone Test:
   A cotton pad soaked with acetone is pressed onto the coated panel. The value listed is the time after which the film can be scratched off the panel with a fingernail.
(3) Adhesion:
   (3.1) This is the adhesion of an acid-catalyzed, commercially available finishing enamel based on a combination of a saturated polyester and a melamine resin (quality of automobile finishes); stoving conditions 30 min/140° C. to the applied binder.
   Test: Cross-hatch according to DIN 53 151 six hours after stoving.
   (3.2) and (3.3) These are, respectively, the adhesion of a commercially available underbody protection compound based on a PVC-plastisol and of a commercially available sealant based on a PVC-plastisol to the applied binder. The materials are applied to the primer coated panels in a film thickness of 3 to 5 mm; and, after the prescribed cure, two cuts are made into the coating with a sharp knife, such that a strip of 1 cm results. The possibility of removing the strip is recorded, 1 meaning good adhesion (the strip breaks but does not come off); and 5 meaning bad adhesion, the strip coming off easily.

For comparison, Example 3 of U.S. Pat. No. 4,458,054 was used (VGL).

Key to Table 1:
N=neutralization (millimoles acid/100 g of resin solids)
A=deposition voltage (Volt)
AE=deposition equivalent (mg/Cb)
SST=salt spray test

TABLE 1

| Ex. # | N | pH-Value | A | AE | SST A | SST B | Acetone Test A | Acetone Test B | Adhesion 3.1 | Adhesion 3.2 | Adhesion 3.3 |
|---|---|---|---|---|---|---|---|---|---|---|---|
| 1 | 25 | 6.0 | 360 | 42 | 240 | 360 | 90 | 120 | Gt 0 – 1 | 2 | 2 – |
| 2 | 30 | 6.7 | 360 | 36 | 180 | 360 | 90 | 120 | Gt 1 | 1 – 2 | 1 – 2 |
| 3 | 35 | 6.5 | 360 | 48 | 240 | 400 | 85 | 120 | Gt 0 | 1 – | 1 |
| 4 | 30 | 7.5 | 300 | 39 | 320 | 360 | 85 | 120 | Gt 1 – | 1 – 2 | 1 – 2 |
| 5 | 30 | 6.9 | 390 | 36 | 360 | 500 | 120 | 120 | Gt 0 | 1 | 1 |
| 6 | 25 | 7.1 | 360 | 33 | 360 | 500 | 120 | 120 | Gt 0 | 1 | 1 |
| 7 | 25 | 6.3 | 330 | 35 | 320 | 360 | 100 | 100 | Gt 0 | 1 | 1 |
| 8 | 25 | 6.5 | 360 | 38 | 360 | 400 | 120 | 120 | Gt 1 | 1 – 2 | 1 – 2 |
| 9 | 35 | 6.2 | 300 | 32 | 240 | 320 | 80 | 100 | Gt 0 | 0 – 1 | 2 – |

TABLE 1-continued

| Ex. # | N | pH-Value | SST | | Acetone Test | | Adhesion | | |
| | | | A | AE | A | B | A | B | 3.1 | 3.2 | 3.3 |
| --- | --- | --- | --- | --- | --- | --- | --- | --- | --- | --- | --- |
| VGL | 45 | 6.5 | 360 | 27 | 180 | 320 | 40 | 80 | Gt 4 + | 4 | 4 − 5 |

As will be apparent to one skilled in the art, various modifications can be made within the scope of the aforesaid description. Such modifications being within the ability of one skilled in the art form a part of the present invention and are embraced by the appended claims.

It is claimed:

1. Cationic synthetic resin binders free of epoxy groups which are particularly suited for the formulation of electrodepositable-paints comprising the reaction product at about 20° to 150° C. of an epoxy resin carrying at least 2 epoxy groups and having an epoxy equivalent of 190 to 1000, with from 0.1 to 1.0 amino groups per available epoxy group on said epoxy resin of a secondary amine of the general formula

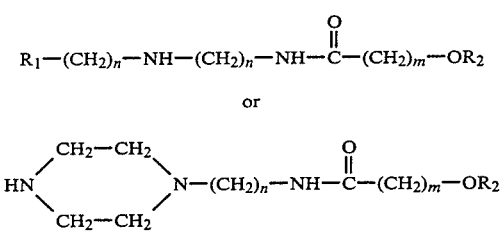

wherein
n is 2 through 4, m is 1 through 5, and
$R_1$ is —OH or

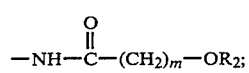

$R_2$ is —H or

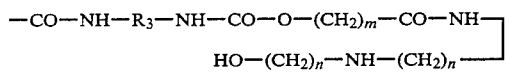

and
$R_3$ is an aromatic, cycloaliphatic or aliphatic hydrocarbon radical.

2. Binders according to claim 1 wherein said secondary amine has general formula (I) and is the reaction product of a dialkylene triamine or alkylamino-alkanol amine with a hydroxy carboxylic acid ester.

3. Binders according to claim 2 wherein said hydroxy carboxylic acid ester is an inner ester (lactone) of the acid.

4. Binders according to claim 2 wherein said hydroxy carboxylic acid ester is the reaction product of 1 mole of a diisocyanate with 2 moles of glycolic acid ester.

5. Binders according to claim 4 wherein said secondary amine is a transamidation product of the ester product according to claim 4, with 2 moles of amino-ethyle-thanolamine.

6. Binders according to claim 1 wherein an additional active hydrogen compound is reacted with the epoxy groups of said epoxy resin.

7. Binders according to claim 6 wherein said active hydrogen compound contains hydroxy, carboxy, or amino groups.

8. Binders according to claim 7 wherein said active hydrogen compound is an oligomeric or polymeric compound.

9. Binders according to claim 6 wherein said active hydrogen compound is reacted with said epoxy resin before said secondary amine is reacted with said epoxy resin.

10. Binders according to claim 6 wherein said active hydrogen compound is a primary or secondary amine.

11. Binders according to claim 10 wherein said active hydrogen compound is a primary amine which includes a tertiary amine group.

12. Process of producing cationic synthetic resin binders free of epoxy groups which are particularly suited for the formulation of electrodepositable-paints comprising reacting at from about 20° to 150° C. an epoxy resin carrying at least 2 epoxy groups and having an epoxy equivalent of 190 to 1000, with from 0.1 to 1.0 amino groups per available epoxy group on said epoxy resin of a secondary amine of the general formula

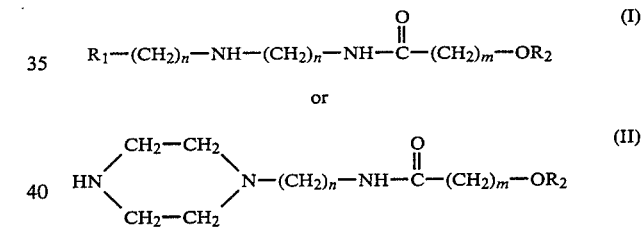

wherein
n is 2 through 4, m is 1 through 5, and
$R_1$ is —OH or

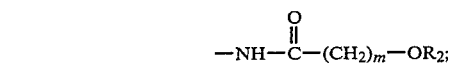

$R_2$ is —H or

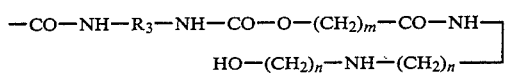

and
$R_3$ is an aromatic, cycloaliphatic or aliphatic hydrocarbon radical.

13. Process according to claim 12 wherein said reaction is carried out in an inert solvent.

14. Process according to claim 12 wherein said secondary amine has general formula (I) and is the reaction product of a dialkylene triamine or alkylamino-alkanol amine with a hydroxy carboxylic acid ester.

15. Process according to claim 14 wherein said hydroxy carboxylic acid ester is an inner ester (lactone) of the acid.

16. Process according to claim 14 wherein said hydroxy carboxylic acid ester is the reaction product of 1 mole of a diisocyanate with 2 moles of glycolic acid ester.

17. Process according to claim 16 wherein said secondary amine is a transamidation product of the ester product according to claim 4, with 2 moles of aminoethylethanolamine.

18. Process according to claim 12 wherein an additional active hydrogen compound is reacted with the epoxy groups of said epoxy resin.

19. Process according to claim 18 wherein said active hydrogen compound contains hydroxy, carboxy, or amino groups.

20. Process according to claim 19 wherein said active hydrogen compound is an oligomeric or polymeric compound.

21. Process according to claim 18 wherein said active hydrogen compound is reacted with said epoxy resin before said secondary amine is reacted with said epoxy resin.

22. Process according to claim 18 wherein said active hydrogen compound is a primary or secondary amine.

23. Process according to claim 22 wherein said active hydrogen compound is a primary amine which includes a tertiary amine group.

* * * * *